A. BERTRAM.
GUARD FOR TIRES.
APPLICATION FILED OCT. 19, 1917.
1,267,360.
Patented May 28, 1918.
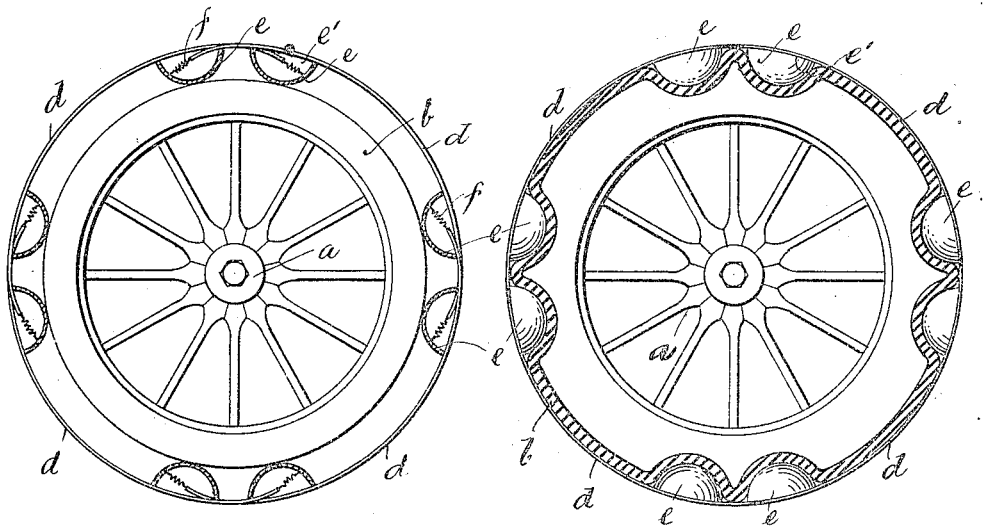
Fig. 1
Fig. 2
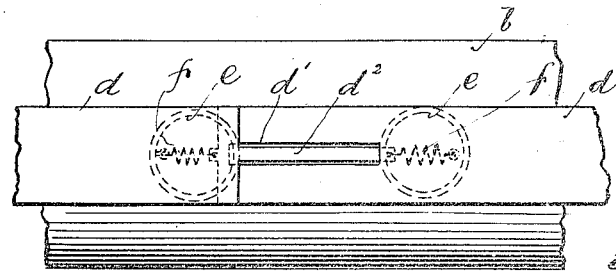
Fig. 3
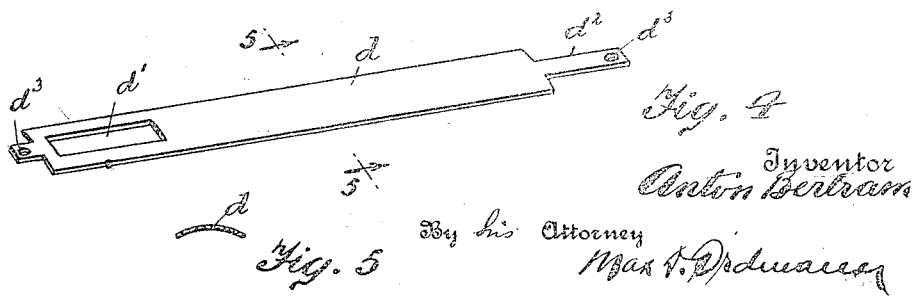
Fig. 4
Fig. 5
Inventor
Anton Bertram
By his Attorney

UNITED STATES PATENT OFFICE.

ANTON BERTRAM, OF WESTFIELD, NEW JERSEY.

GUARD FOR TIRES.

1,267,360.

Specification of Letters Patent.  Patented May 28, 1918.

Application filed October 19, 1917. Serial No. 197,405.

*To all whom it may concern:*

Be it known that ANTON BERTRAM, a subject of the Emperor of Austria-Hungary, residing at Westfield, in the county of Union and State of New Jersey, has invented certain new and useful Improvements in Guards for Tires, of which the following is a specification.

The present invention relates to guards for pneumatic tires and has for its principal object to provide a guard which will serve to protect the tire from puncture and also as anti-skidding device.

Another object of my invention is to so construct the guard that the same can be easily and readily applied to the tire.

A still other object of my invention is to provide a guard which will be elastic and capable of adapting itself to the circumference of an inflated tire.

With these and other objects in view my invention consists in the construction, combination and arrangement of parts as will be fully described and set forth in the appended claims.

In the drawing in which similar reference characters denote corresponding parts Figure 1 is a side elevation of a wheel showing my device partly in section applied to the tire before the latter is inflated; Fig. 2 is a similar view in which the tire is shown inflated and in section; Fig. 3 is a tread plan of a portion of the tire and the novel device; Fig. 4 is a perspective view of one of the rim sections which compose my device and Fig. 5 is a cross section thereof.

Referring to the drawing more in detail $a$ denotes a wheel having a pneumatic tire $b$ which is fixed to it in well known manner. My new guard comprises a rim adapted to be placed around the periphery of the tire so as to protect it against becoming punctured and to also serve as an anti-skidding device, and of means for holding the rim in position on the tire.

The rim which may be made of steel or other suitable, durable and resilient material is composed of a number of individual segmental sections $d$, which are adapted when assembled to embrace the periphery of the tire. Each rim section is provided near one end with a notch or recess $d^1$ and at its opposite end with a tongue portion $d^2$ adapted to pass through the notch of an adjacent rim section. At both ends eyes $d^3$ or the like are provided for the purpose to be hereafter described. Adapted to bear on the outer surface of the tire and when the latter is inflated to become embedded therein are sockets $e$ of spherical shape or in form of cups, of which there is one for each end of the several rim sections. In the present example the rim is shown to consist of four segmental sections and accordingly there are eight cups or sockets $e$. The cups, which are of metal or other suitable material, are adapted to rest with their spherical bottom on the tire and with the opening or mouth $e^1$ directed outwardly. The same are so admeasured that the width or diameter of the opening thereof is about equal to or somewhat smaller than the width of a rim section, so that when the rim sections are placed around the tire they will cover the sockets $e$ entirely closing their mouths $e^1$, as shown in Fig. 3. The cups are arranged on the periphery of the tire in pairs, that is each two cups being located near one another to serve for the attachment of the ends of two adjoining strips or rim sections $d$. In assembling the latter around the tire, the sections are so placed end to end that the tongue $d^2$ of each one passes through the notch $d^1$ of the adjoining one, thus interengaging with and overlapping one another at their ends. The ends of the several sections are bent inwardly toward the surface of the tire and into the corresponding cup or socket $e$. In each cup there is secured with one end a spring $f$ of which the other end is adapted to be secured to the eye $d^3$ of the end of the corresponding rim section.

When thus assembled the cups or sockets are lodged between the rim sections and the tire and are entirely concealed by the rim. Upon inflation of the tire the cups become embedded in the outer surface of the tire as shown in Fig. 2, the mouths or openings thereof being covered or closed by the rim sections which tightly embrace the outer surface of the inflated tire.

The rim sections $d$ may be curved as clearly seen from Figs. 3 and 4, so that they may conform with and adapt themselves to the periphery of the inflated tire.

The construction heretofore described represents of course, only one embodiment of my invention. It is clear that the same can be modified by those skilled in the art in various ways without departing from the principle of my invention and I, therefore, do not wish to restrict myself to the details shown and described.

What I claim and desire to secure by Letters Patent is:

1. In a tire guard, the combination with a pneumatic tire, of a rim adapted to embrace the periphery of the tire and composed of individual sections, cup shaped sockets adapted to loosely bear on the outer surface of the tire and to become embedded therein when the latter is inflated, the said rim sections being adapted to interengage with one another, and means in said sockets for fastening the said sections in position.

2. In a tire guard, the combination with a pneumatic tire, of a rim adapted to embrace the periphery of said tire and composed of individual sections, each rim being formed at one end with a recess and with a tongue at the opposite end, a socket for each end of the several rims adapted to be embedded in the outer surface of the tire when inflated and means in said sockets for fastening said sections in position.

3. In a tire guard, the combination with a pneumatic tire, of a rim adapted to embrace the periphery of said tire and composed of individual sections, each section being formed at one end with a recess and at the opposite end with a tongue, a tongue of one rim section being adapted to pass through the recess of the adjoining rim section, a hemispherically shaped socket for each end of the several rim sections adapted to loosely bear on and to be embedded in the outer surface of the tire when inflated and a spring in each socket to be attached to the end of the rim section passed into it and to hold the rim sections in position on the tire.

In testimony whereof I affix my signature in presence of two witnesses.

ANTON BERTRAM.

Witnesses:
   E. D. JUNIOR,
   MAX D. ORDMANN.